May 31, 1966 T. M. KERSKER 3,253,633
PNEUMATIC TIRES
Filed March 23, 1964 2 Sheets-Sheet 1

INVENTOR.
THEODORE M. KERSKER
BY
J.B. Holden
ATTORNEY

TIRE DURABILITY AS A
FUNCTION OF TIRE
OPERATING
TEMPERATURE

TIRE OPERATING
TEMPERATURE &
TIRE TREAD-WEAR
AS FUNCTIONS OF
TIRE DIMENSIONS

----- = TEMPERATURE CURVE
——— = TREAD-WEAR CURVE

TREAD-SHOULDER GAUGE
VS TREAD-WEAR
& DURABILITY

------- = TREAD-WEAR CURVE
——— = DURABILITY CURVE

*INVENTOR.*
THEODORE M. KERSKER
BY
*J. B. Holden*
ATTORNEY

United States Patent Office 3,253,633
Patented May 31, 1966

3,253,633
PNEUMATIC TIRES
Theodore M. Kersker, Akron, Ohio, assignor to The Goodyear Tire & Rubber Company, Akron, Ohio, a corporation of Ohio
Filed Mar. 23, 1964, Ser. No. 353,916
6 Claims. (Cl. 152—330)

This invention relates to pneumatic tires. More particularly, this invention relates to improved pneumatic tires embodying particular materials and a tire design having carefully controlled construction characteristics.

Conventional pneumatic tires that are in use today are, for the most part, constructed with cotton, rayon or nylon cords. More recently polyester fibers have been employed to produce high strength cords that have permitted tires to be built that have overall superior performance that results from improvements in treadwear, dimensional stability, and ride and handling characteristics. However, in spite of these superior properties of tires built with polyester cords, such tires have not in the past been completely successful, primarily because of the susceptibility of polyester cords to deteriorate rapidly at the very high temperatures that can be encountered in conventionally constructed tires during severe service.

It is an object of this invention to provide an improved pneumatic tire. Another object of this invention is to provide an improved pneumatic tire employing polyester cords in its construction. A further object of this invention is to provide a pneumatic tire that is not susceptible to execessive heat buildup during use and can therefore safely employ polyester cords in its construction.

In accordance with the present invention tires are constructed employing a multiplicity of cord plies made from polyester cords and a tread made from a rubber composition selected from the group consisting of (1) ethylene-propylene-terpolymer (EPT) rubber, (2) a blend of cis-1,4 polybutadiene rubber and a rubbery copolymer of butadiene and styrene (SBR), (3) a blend of cis-1,4 polybutadiene rubber and natural rubber, and (4) a blend of cis-1,4 polybutadiene rubber and cis-1,4 polyisoprene rubber (a synthetic natural rubber). Furthermore, in accordance with the present invention these tires are constructed in such a manner that they develop a minimum of heat buildup during use without sacrifice of other desirable properties, such heat buildup not exceeding 275° F. even when subjected to very rigorous conditions of use. In order to control the heat buildup in passenger tires constructed with polyester cords and the above-described treads, it has been found that the tire must be constructed with a "tread shoulder gauge" (TSG) that does not exceed 0.850 inch (850 mils). From a practical consideration, it is desirable to have as much rubber in the tread of a passenger tire as possible to give maximum treadwear providing other performance characteristics, such as heat buildup, are not seriously adversely affected. It has been found that a tread shoulder gauge of 0.600 inch (600 mils) will be a lower practical limit for most passenger tires when ethylene-propylene-terpolymer rubber or blends containing cis-1,4 polybutadiene rubber are employed in the tread. It has been found that the optimum tread shoulder gauge (TSG) for any given size passenger tire has the following relationship to the tire's "section width" (SW):

$$TSG = K\sqrt{SW}$$

where:

$TSG$ = tread shoulder gauge in inches
$SW$ = section width in inches
$K$ = a constant = 0.28.

The object of the present invention and the manner in which these objects are accomplished will be more readily understood by reference to the following specification and accompanying drawings wherein.

Figure 1:
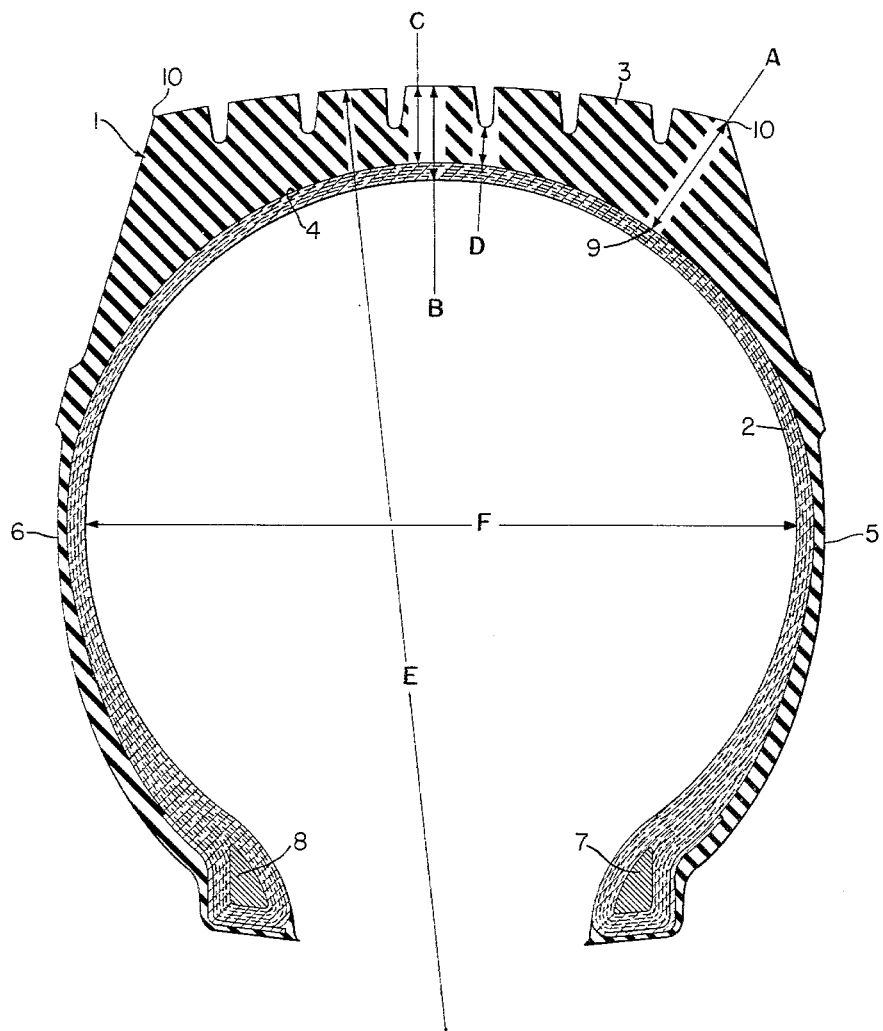
FIG. 1 is a sectional view of a tire taken perpendicular to its principal axis of rotation.

Referring to FIG. 1, a pneumatic tire, generally indicated by the numeral "1" is comprised of a rubberized fabric body portion or carcass 2 having a tread 3 superimposed and bonded to the crown area 4 of the carcass 2. Rubber sidewalls 5 and 6 extend from the respective edges of the tread over the carcass to the bead portions 7 and 8. The dimension "A" from the top surface of the cords in the outer ply adjacent to the tread 9 to the outer limit of the tread at the shoulder 10 is referred to as "tread shoulder gauge." The dimension "B" from the underside of the carcass 2 vertically to the top of the tread 3 is referred to as "total centerline gauge." The dimension "C" from the top surface of the cords in the outer ply adjacent to the tread 9 to the top of the tread 3 is referred to as "tread center gauge." The dimension "D" from the top surface of the cords in the outer ply adjacent to the tread 9 to the bottom of the groove in the tread 3 is referred to as "under tread gauge." Tread radius "E" is the radius of the arc formed by the tread surface measured in a plane perpendicular to the principal axis of rotation of the tire. The "section width" (SW) "F" is the internal diameter of the tire measured from the inner surface of the carcass.

The term "passenger tire" as employed throughout this specification and the accompanying claims is meant to describe those tire sizes and types commonly used on motor vehicles designated as automobiles. Most passenger tires range in size from 6.00-13 to 9.50-14. A representative, but not all-inclusive, listing of USA tire sizes is given in the 1962 yearbook of the Tire and Rim Association, pages 1-02 to 1-07.

Figure 2:
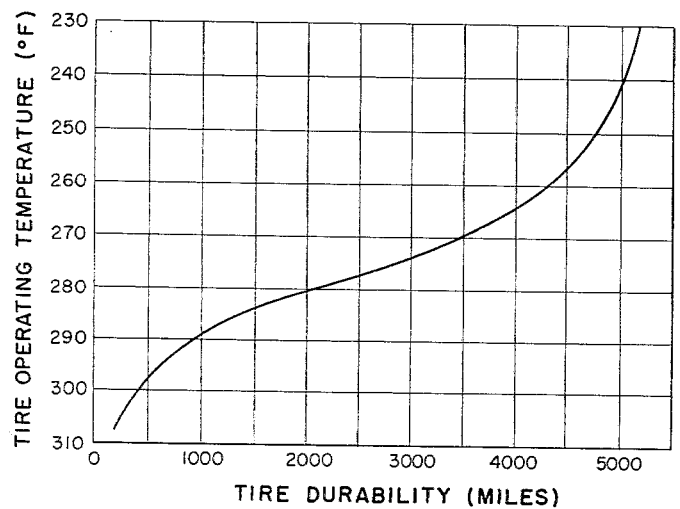
FIG. 2 is a graph showing a plot of tire durability as a function of tire operating temperature for tires built in accordance with the invention and constructed with treads built from a blend of SBR and cis-1,4 polybutadiene rubbers and polyester cords.

Previous efforts to employ cords made from polyester fibers in the construction of tires have frequently resulted in cord failure when the tire was subjected to high speed service because heat buildup in the tire exceeded the point where polyester cords were stable. It has been found that if the operating temperature of the tire exceeds 275° F. polyester cords tend to deteriorate rapidly and the tire durability is sharply reduced at operating temperatures above 275° F. This relationship is shown in FIG. 2 wherein tire durability (in miles) is plotted as a function of tire operating temperature. The "tire durability test" is conducted according to the following procedure:

The tire to be tested is mounted on a standard heavy duty rim and inflated to a normal operating pressure, approximately 26 pounds per square inch for most passenger tires. The tire is then forced against a large cleated test wheel under a predetermined load that is approximately 120 percent of the Tire and Rim Association's "maximum permissible load." The large driving wheel against which the tire under test is forced is equipped with six metal cleats ¾ inch high and 2 inches wide evenly spaced around the circumference of the driving wheel and securely bolted thereto. The driving wheel and therefore the tire under test is rotated at 45 miles per hour and the results of the test are recorded as the number of miles the tire travels before tire failure occurs.

"Tire operating temperature" is measured by the use of a probe and thermocouple with the aid of a potentiometer. The probe is inserted into the tire at three predrilled holes in the shoulder area of the tire. The probe is first inserted into one of the test holes to warm it up and the temperature of the tire then determined by making temperature measurements in the other two test holes.

Figure 3:
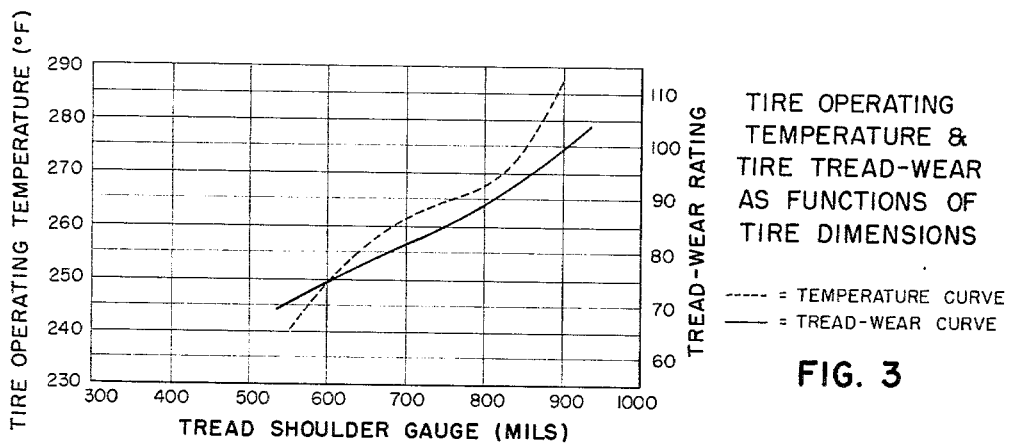
FIG. 3 is a graph showing a plot of tire operating temperature and treadwear as a function of critical tire dimension. This graph is based on data obtained from tires constructed with (1) treads built from a blend of SBR and cis-1,4 polybutadiene rubbers and (2) polyester cords.

It is a generally well known relationship that the greater the thickness of the tread rubber for any given rubber composition the greater will be the tread wear. However, there are practical limits which the tread thickness cannot exceed in most tire constructions. Since "heat buildup" is more pronounced in a tire with a thicker tread and since the shoulder area of a tread is the thickest portion of the tread the temperature buildup in the shoulder area is the maximum encountered any place in the tire during its normal operation. The relationship between tire operating temperature and treadwear rating versus critical tire dimension for 8.20-15 passenger tires constructed in accordance with the present invention is shown by the values in the following table and by the plot of these values in FIG. 3.

TABLE I

| Tire Dimensions (Tread Shoulder Gauge)—Inches | Tire Operating Temp., °F. | Tread Wear Ratings |
|---|---|---|
| .600 | 250 | 75 |
| .700 | 262 | 82 |
| .800 | 267 | 89 |
| .900 | 288 | 100 |

The treadwear rating of a tire is determined in accordance with the following procedure: The test is conducted on an automobile on an open highway that permits speeds of 70 miles per hour. Tires are tested at four pounds per square inch under the recommended Tire and Rim Association's inflation pressures and 7 percent over the recommended Tire and Rim Association's loads. The tires are run continuously at 70 miles per hour until worn smooth and the number of miles recorded and used as the basis for the rating of the tire against a standard tire that has been assigned an arbitrary treadwear rating of 100.

Figure 4:
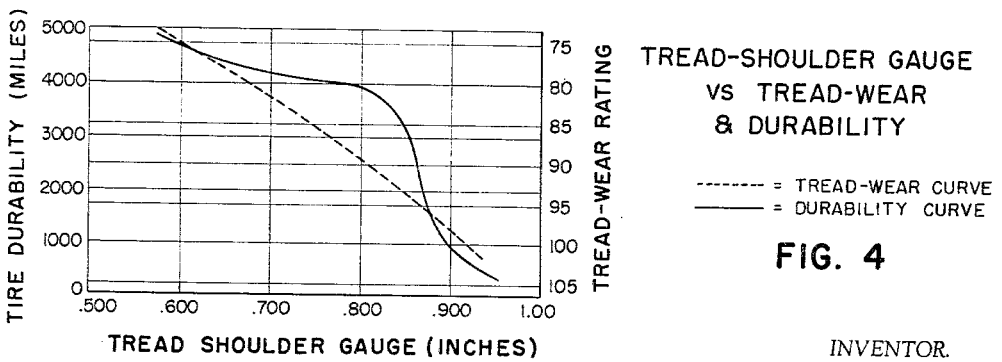
FIG. 4 is a graph showing a plot of tire durability and treadwear rating as a function of a critical tire dimension. The data on which this graph is based has been determined for tires built in accordance with the present invention employing polyester cords and a tread compounded from a blend of SBR and cis-1,4 polybutadiene rubbers.

From the above discussion it will be apparent that "tread wear rating" increases with increased tread thickness, which for convenience can be measured on a comparative basis as the thickness of the tread at the shoulder, a dimension we have previously referred to as "tread shoulder gauge." It also follows from the preceding discussion that since "tire durability" decreases with increasing temperature and a tire operating temperature increases with increasing thickness of rubber in the tread, which again can be conveniently measured at the shoulder as "tread shoulder gague" that "tire durability" varies inversely with "tread shoulder gauge." The relationship between "tire durability" and "tread wear rating" as a function of "tread shoulder gauge" is shown by the values in the following table and by the plot of these values in FIG. 4:

TABLE II

| Tire Dimensions (Tread Shoulder Gauge)—Inches | Tire Durability, Miles | Tread Wear Rating |
|---|---|---|
| 0.600 | 4,720 | 75 |
| .700 | 4,160 | 82 |
| .800 | 4,000 | 89 |
| .850 | 3,130 | 95 |
| .900 | 995 | 100 |

The relationship between tire operating temperature and treadwear rating versus tread shoulder gauge was further evaluated with tires built in accordance with the present invention employing polyester cords in the carcass and treads made from EPT rubber. The carcass of these tires was built with two plies of 1100/3 polyester cord having 28 ends per inch.

TABLE III

| Tire Dimensions (Tread Shoulder Gauge)—Inches | Tire Operating Temperature, °F. | Tread Wear Rating |
|---|---|---|
| .665 | 259 | 81 |
| .690 | 261 | 83 |
| .715 | 262 | 84 |

The pneumatic tires that are to be built in accordance with the present invention are constructed on a tire carcass which may contain two or more plies of cord made from polyester fibers. By the term "polyester cords" as employed in this specification and the accompanying claims is meant cords produced of fibers prepared from linear polyester resins, the fibers having the following characteristics: (a) intrinsic viscosity in 60/40 phenol/tetrachloroethane at 30° C. greater than 0.55, (b) yarn tenacity in excess of 5.5 grams per denier and (c) a melting point greater than 450° F.

The ethylene-propylene-terpolymer (EPT) rubbers that may be used in compounding treads for tires constructed in accordance with the present invention are terpolymers having a sulfur-curable double bond that may be conveniently built into the ethylene-propylene polymer by introducing a third monomer into the polymer. This third monomer must be a non-conjugated diene wherein the double bonds are preferably separated by more than two carbon atoms. Useful sulfur-curable (EPT) rubbers are described in greater detail in U.S. Patent 2,933,480.

Cis-1,4 polybutadiene rubbers that are useful in compounding treads in accordance with the present invention are prepared by polymerizing butadiene in the presence of a catalyst formed by the interaction of organometallic compounds, such as trialkyl aluminum compounds, and a transition metal compound such as the titanium tetrahalides. Preferred trialkyl aluminum compounds are those in which the alkyl group contains not more than six carbon atoms. The polymerization reaction is usually conducted with the catalyst as the dispersed phase in a solvent monomer mixture. Catalysts based on $TiI_4$ are particularly effective in polymerizing butadiene to produce a polymer having a high percentage (90 percent or more) of its diene units polymerized through 1,4 addition and in cis configuration. A more detailed description of the preparation of cis-1,4 polybutadiene rubbers may be found in the following references:

(1) "New Controlled-Structure Polymer of Butadiene" Rubber and Plastic Age, March 1961, pp. 276–282 by W. W. Crouch (2) "1,4-Cis Polybutadiene" Gummi and Asbest, vol. 13, p. 1026 (1960)

Cis-1,4 polyisoprene rubbers that are useful in compounding treads according to the invention are prepared by polymerizing isoprene employing the same general conditions and class of catalyst described above in connection with the polymerization of butadiene. Catalysts based on $TiCl_4$ and $TiBr_4$ are particularly effective in polymerizing isoprene to produce a polymer having a high percentage (90 percent or more) of its diene units polymerized through 1,4 addition and in cis configuration. A more detailed description of the preparation of cis-1,4 polyisoprene rubbers may be found in the following references:

(1) "Synthetic Natural Rubbers from Isoprene" Rubber and Plastic Age, vol. 39 No. 11 page 938 (1958) by Mayor, Saltman and Pierson
(2) "Cis-1,4 Polyisoprene Prepared with Alkyl Aluminum and Titanium Tetrachloride" Industrial and Engineering Chemistry, vol. 50 pages 1507–1510 (1958) by Adams, Stearns, Smith and Binder The rubbery copolymers of butadiene and styrene that are useful in compounding treads in accordance with this invention are copolymers containing from 50 to 90 percent butadiene.

When cis-1,4 polybutadiene is blended with other rubbers such as natural, SBR or cis-1,4 polyisoprene to produce treads that are to be employed in building tires of the present invention, the cis-1,4 polybutadiene rubber may make up from 10 to 60 percent of the rubber in the tread compound and the other rubber will constitute from 90 to 40 percent of the rubber in the tread.

A consideration of the data that has been shown above will make it apparent that in a tire constructed with polyester cords and with either EPT rubber or a rubber blend containing a substantial percentage of cis-1,4 polybutadiene rubber in the tread that "tread shoulder gauge" is a dimension that must be controlled within rather critical limits. It has been found that if the "tread shoulder gauge" exceeds approximately 850 mils that the tire durability decreases rapidly, primarily because of excessive heat buildup. This relationship is shown in the plots presented as FIGS. 3 and 4.

In addition to controlling the "tread shoulder gauge" of passenger tires built in accordance with the present invention so that it will not exceed 850 mils, it may in some instances be found desirable to control the TSG so as to be at least 600 mils.

It may also frequently be desirable to control other specific dimensions of the tire produced in accordance with the present invention within definite limits. These other dimensions that may be desirable to control are:

(1) "Total centerline gauge" between 600–780 mils
(2) "Tread center gauge" between 400–490 mils
(3) "Under tread gauge" between 75 and 110 mils
(4) "Tread radius" between 7.0 and 11.0 inches However, the tire dimensions other than the "tread shoulder gauge" do not necessarily need to be controlled in tires built in accordance with the present invention as long as the "tread shoulder gauge" does not exceed 850 mils.

A typical 8.00–14 tire in accordance with the present invention was built on a tire carcass constructed with four plies of 1100/3 cords made of polyethylene terephthalate and having 25 ends per inch. The tread was compounded from 20 percent of cis-1,4 polybutadiene rubber and 80 percent SBR. The "tread shoulder gauge" was 790 mils; the "total centerline gauge" was 700 mils; the "tread center gauge" was 470 mils and the "under tread gauge" was 90 mils.

Construction of a typical tire in accordance with the present invention has been demonstrated in the foregoing example employing polyethylene terephthalate cords in the carcass. In addition to polyethylene terephthalate other linear polyesters and particularly linear polyesters of aromatic dicarboxylic acids may be employed in building tires in accordance with the invention. Representative examples of such polyesters are polycyclohexane dimethyl terephthalate, polytetramethylene terephthalate and high melting copolyesters, such as 90/10 ethylene terephthalate-ethylene isophthalate copolyester. It being understood that any of these linear polyesters must have fibers whose intrinsic viscosity, yarn tenacity and melting point are within the limits discussed above.

While certain representative embodiments and details have been shown for the purpose of illustrating the invention, it will be apparent to those skilled in this art that various changes and modifications may be made therein without departing from the spirit or scope of the invention.

What I claim is:

1. A pneumatic passenger tire having a carcass constructed with a multiplicity of plies made from polyester cords and a tread made from a rubber composition selected from the group consisting of (1) ethylene-propylene-terpolymer rubber, (2) a blend containing from 10 to 60 percent cis-1,4 polybutadiene rubber and from 90 to 40 percent of a rubbery copolymer of butadiene and styrene, (3) a blend containing from 10 to 60 percent cis-1,4 polybutadiene rubber and from 90 to 40 percent of natural rubber and (4) a blend containing from 10 to 60 percent cis-1,4 polybutadiene rubber and from 90 to 40 percent of cis-1,4 polyisoprene rubber, said tread having a tread shoulder gauge constructed to be from 600 to 850 mils.

2. A pneumatic passenger tire having a carcass constructed with a multiplicity of plies made from polyester cords and a tread made from a rubber composition selected from the group consisting of (1) ethylene-propylene-terpolymer rubber, (2) a blend containing from 10 to 60 percent cis-1,4 polybutadiene rubber and from 90 to 40 percent of a rubbery copolymer of butadiene and styrene, (3) a blend containing from 10 to 60 percent cis-1,4 polybutadiene rubber and from 90 to 40 percent of natural rubber and (4) a blend containing from 10 to 60 percent cis-1,4 polybutadiene rubber and from 90 to 40 percent of cis-1,4 polyisoprene rubber, said tread being further characterized by being constructed to have a tread shoulder gauge with the following relationship to the tire section width:

$$TSG = K\sqrt{SW}$$

where:

$TSG$ = tread shoulder gauge in inches
$SW$ = section width in inches
$K$ = a constant = 0.28

3. In a pneumatic passenger tire having a carcass constructed with a multiplicity of plies made from polyester cords and a tread compound with from 10 to 60 percent by weight of cis-1,4 polybutadiene rubber the improvement wherein the tread shoulder gauge is constructed to be from 600 to 850 mils.

4. In a pneumatic passenger tire having a carcass constructed with a multiplicity of plies made from polyester cords and a tread compounded from ethylene-propylene-terpolymer rubber the improvement wherein the tread shoulder gauge is constructed to be from 600 to 850 mils.

5. In a pneumatic passenger tire having a carcass constructed with polyester cords and a tread compounded with from 10 to 60 percent by weight of cis-1,4 polybutadiene rubber the improvement wherein the tire is constructed to have the following dimensions: (a) "tread shoulder gauge" between 600 and 850 mils; (b) "total centerline gauge" between 600 and 780 mils; (c) "tread center gauge" between 400 and 490 mils; (d) "under tread gauge" between 75 and 110 mils; and (e) "tread radius" between 7.0 and 11.0 inches.

6. In a pneumatic passenger tire having a carcass constructed with polyester cords and a tread compounded with from 10 to 60 percent by weight of cis-1,4 polybutadiene rubber the improvement wherein the tire is constructed to have the following dimensions: (a) "tread shoulder gauge" 780 mils; (b) "total centerline gauge" 750 mils; (c) "tread center gauge" 470 mils; (d) "under tread gauge" 100 mils; and (e) "tread radius" 10.0 inches.

References Cited by the Examiner

UNITED STATES PATENTS

| | | | |
|---|---|---|---|
| 2,869,610 | 1/1959 | Lippmann et al. | 152—354 |
| 3,004,018 | 10/1961 | Naylor. | |
| 3,060,989 | 10/1962 | Railsback et al. | 152—330 |

ARTHUR L. LA POINT, *Primary Examiner.*

C. W. HAEFELE, *Assistant Examiner.*